(12) United States Patent
Doljack

(10) Patent No.: US 8,179,103 B2
(45) Date of Patent: May 15, 2012

(54) SYSTEM AND METHOD FOR BOOSTING BATTERY OUTPUT

(75) Inventor: Frank Anthony Doljack, Pleasanton, CA (US)

(73) Assignee: Cooper Technologies Company, Houston, TX (US)

( * ) Notice: Subject to any disclaimer, the term of this patent is extended or adjusted under 35 U.S.C. 154(b) by 447 days.

(21) Appl. No.: 12/098,059

(22) Filed: Apr. 4, 2008

(65) Prior Publication Data

US 2008/0246443 A1    Oct. 9, 2008

Related U.S. Application Data

(60) Provisional application No. 60/910,067, filed on Apr. 4, 2007.

(51) Int. Cl.
H02J 7/00 (2006.01)
H02J 7/14 (2006.01)

(52) U.S. Cl. .................. 320/166; 320/104; 320/167

(58) Field of Classification Search .............. 320/104, 320/166, 167
See application file for complete search history.

(56) References Cited

U.S. PATENT DOCUMENTS

| 4,616,303 | A | | 10/1986 | Mauthe | |
|---|---|---|---|---|---|
| 5,710,699 | A | * | 1/1998 | King et al. | 363/132 |
| 5,783,928 | A | * | 7/1998 | Okamura | 320/122 |
| 6,605,921 | B2 | | 8/2003 | Osada et al. | |
| 2003/0187485 | A1 | | 10/2003 | Sturman et al. | |
| 2003/0214270 | A1 | * | 11/2003 | Shiue et al. | 320/166 |
| 2004/0124811 | A1 | * | 7/2004 | Kok et al. | 320/167 |
| 2005/0231184 | A1 | | 10/2005 | Kawaguchi et al. | |
| 2006/0000071 | A1 | | 1/2006 | Dandekar et al. | |
| 2006/0097579 | A1 | | 5/2006 | Okuda et al. | |
| 2006/0133007 | A1 | | 6/2006 | Shiue et al. | |
| 2007/0164693 | A1 | * | 7/2007 | King et al. | 318/109 |
| 2008/0315829 | A1 | * | 12/2008 | Jones et al. | 320/103 |

FOREIGN PATENT DOCUMENTS

WO    WO 2006081613 A1 *    8/2006

OTHER PUBLICATIONS

International Search for PCT/US08/59277; Aug. 1, 2008; 11 pages.

* cited by examiner

Primary Examiner — M'baye Diao
(74) Attorney, Agent, or Firm — Armstrong Teasdale LLP

(57) ABSTRACT

Electrical apparatuses, systems and methods involving battery boost circuitry configured to charge a supercapacitor to a regulated voltage different from the battery voltage and apply a series combination of the regulated voltage and the battery voltage to a load such as a starter motor for an internal combustion engine or a component of a handheld device. The circuitry also includes a contactor connected to the supercapacitor and operable to bypass the capacitor when fully discharged to avoid reverse charging of the supercapacitor.

22 Claims, 13 Drawing Sheets

SYSTEM AND METHOD FOR BOOSTING BATTERY OUTPUT

CROSS-REFERENCE TO RELATED APPLICATION

This application claims priority to U.S. Provisional Application No. 60/910,067, entitled "System and Method for Boosting Battery Output" by Frank A. Doljack, which was filed on Apr. 4, 2007 and which is incorporated by reference herein in its entirety.

BACKGROUND

The disclosure relates in general to electrical devices and circuits, such as, for example, circuits for boosting the output of a vehicle's battery to promote starting the vehicle.

DETAILED DESCRIPTION

Figure 1A:
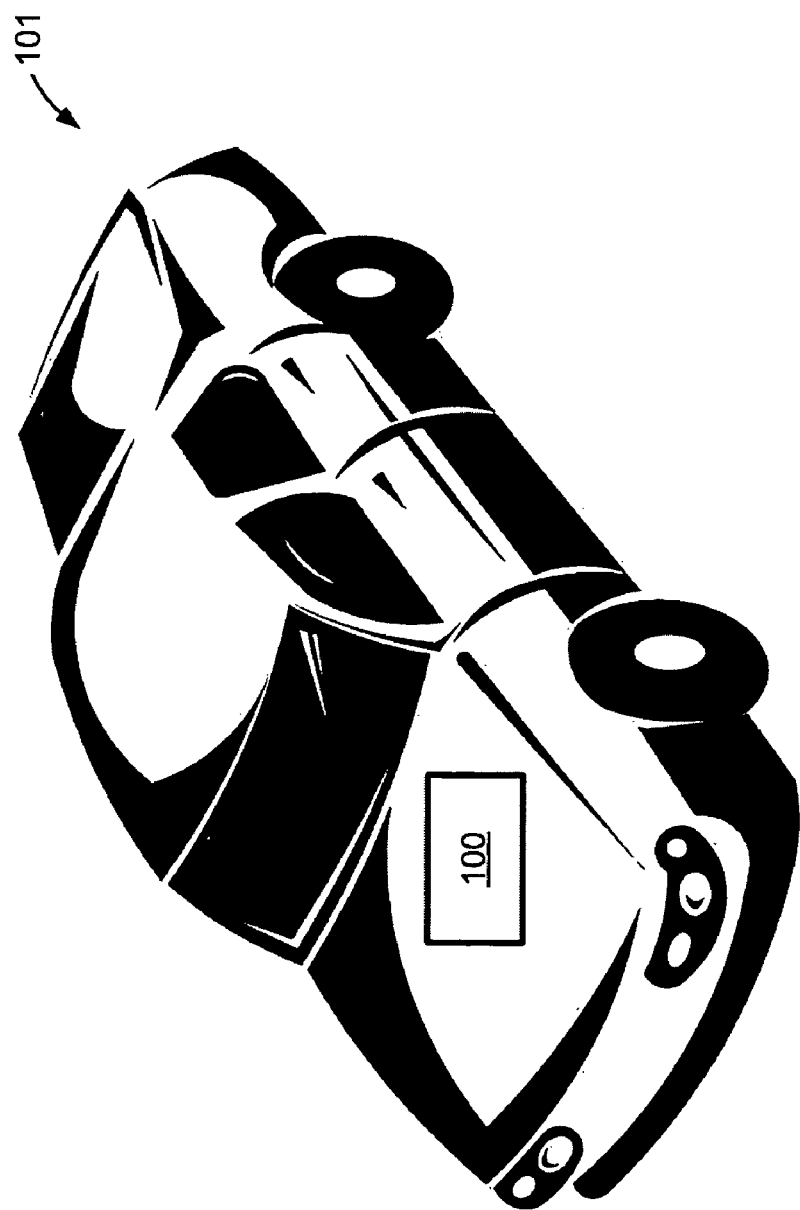
FIG. 1A is an illustration of an exemplary embodiment of a vehicle that comprises a battery boost circuit.
Figure 1B:
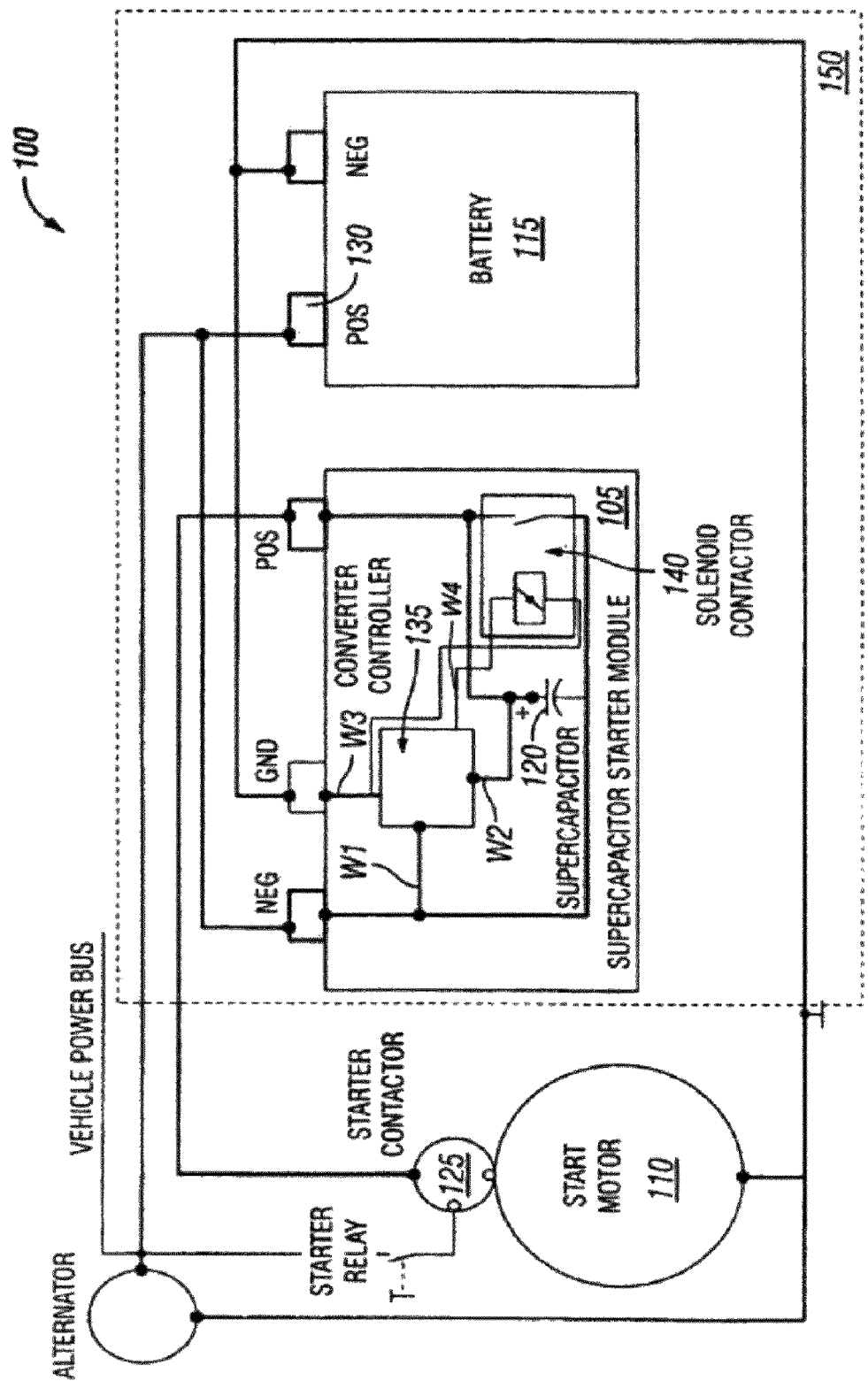
FIG. 1B is an illustration of an exemplary embodiment of a battery boost circuit, as configured for an application involving starting a vehicle.

In one exemplary embodiment, as illustrated in FIG. 1A, a vehicle 101 comprises a circuit 100 for engine starting. As illustrated in FIG. 1B, the circuit 100 places a supercapacitor 120 in a series arrangement with a load 110 and a battery 115, or other suitable power supply, to boost or enhance delivery of electrical energy to the load 110. Such an other suitable power supply can comprise one or more fuel cells, solar cells, or generators, for example. While the circuit 100 can be applied to various load types and is adaptable to many applications, FIG. 1A illustrates the exemplary scenario of boosting battery output to a starter motor 110 of the vehicle's internal combustion engine (not explicitly illustrated in FIG. 1B).

Batteries 115 of vehicles 101, such as automobiles, trucks, motorcycles, boats, airplanes, etc., often exhibit sensitivity to fluctuations in environmental temperature. For example, in cold weather, a lone battery may produce a reduced level of electrical power and may struggle to start a car's engine. Exacerbating the problem, cold temperatures can increase viscosity of oil in the car's engine, thereby requiring more torque from the starter motor 110 to turn or crank the engine, and thus more battery current. In other words, temperature effects on unaided batteries and engines can impede cold weather cranking.

As will be discussed in further detail below, prior to engine starting, the circuit 100 stores energy from the battery 115 in a supercapacitor 120 of the supercapacitor module 105. The circuit 100 charges the supercapacitor 120 in preparation for discharging to supplement electrical power from the battery 115 for engine cranking.

Most supercapacitors are electrochemical capacitors that have higher energy density than more common capacitors, such as electrolytic capacitors. A supercapacitor often visually resembles a regular capacitor but offers much higher capacitance or density of energy storage. Whereas regular capacitors may have conductive foils and a dry separator, exemplary supercapacitors can be viewed as crossing into battery technology by using special electrodes and an electrolyte, which may be either organic or aqueous. The electrodes may comprise activated carbons, metal oxide, or conducting polymers. Many supercapacitors comprise aerogel.

Referring now to FIG. 1B, a driver engages the starter motor 110 to start the engine, typically via turning an ignition key to "pull in" or close the starter contactor 125. At the starting event, the circuit 100 combines stored energy from the supercapacitor module 105 with energy from the battery 115 and delivers that combined energy to the starter motor 110. Thus, the circuit 100 delivers a peak output of electrical power that is significantly higher than the power output of the battery 115 alone. The resulting pulse power or boost in electrical power enhances torque and rotational speed of the starter motor 110 to quickly start the engine, even in cold weather.

In other words, the circuit 100 responds to a trigger event, such as a vehicle operator attempting to start the vehicle's engine. The response comprises the supercapacitor module 105 cooperating with the battery 115 to provide the starter motor 110 with a level of voltage and current that is sufficient to rapidly and efficiently start the engine. The added energy that the supercapacitor 120 delivers during starting of the vehicle's engine provides significant benefit to the driver or vehicle user.

The circuit 100 places the supercapacitor 120 in electrical series with the battery 115 so that the voltage output of the supercapacitor 120 adds to the voltage output of the battery 115. Accordingly, the starter motor 110 receives the added or combined voltages of the charged supercapacitor 120 and the battery 115. The combined voltages drive an enhanced level of current through the internal coils (not explicitly illustrated in FIG. 1B) of the starter motor 110, thereby producing heightened torque and rotational speed of the motor 110 and the associated internal combustion engine.

As will be discussed in further detail below, the supercapacitor module 105 comprises a regulation capability that controls the duration or amount of current applied to the supercapacitor 120 so that the charged supercapacitor 120 has a voltage that is independent from the voltage of the battery 115. Regulating the voltage of the supercapacitor 120 avoids exceeding the voltage rating of the device.

While the discussion that follows will often refer to the circuit 100 (and to other exemplary embodiments and exemplary circuits described herein) in the context of a vehicular starter application, those having skill in the art and the benefit of this disclosure will appreciate that the described application is merely one example in a field of many potential applications. Moreover, those circuits or embodiments can benefit a wide range of applications and can be deployed in various operating environments and contexts. For example, a system, method, or circuit having one or more of the features, functions, or technologies disclosed herein can boost electrical output to handheld devices, communication systems, and flash lamps, to name but a few possibilities. Further, a system or method for boosting battery output can deliver peak electrical current, voltage, and/or power to various other loads, devices, or components that consume high levels of electricity at certain times, while consuming little or essentially no electricity during other times.

Figure 1E:
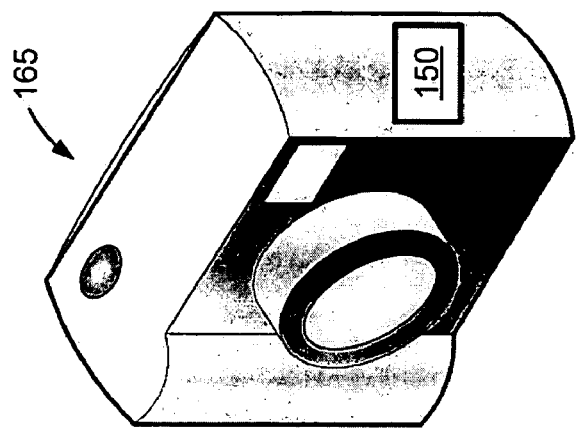
FIG. 1E is an illustration of an exemplary embodiment of a camera that comprises a battery boost circuit.
Figure 1D:
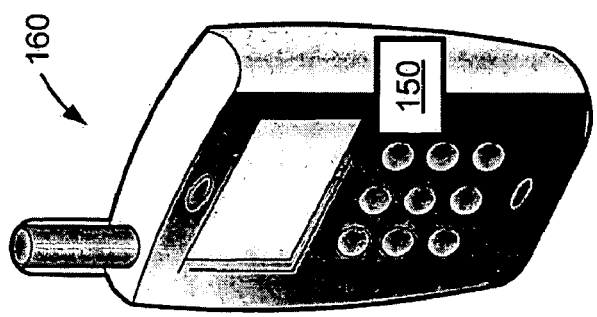
FIG. 1D is an illustration of an exemplary embodiment of a handheld communications or computing device that comprises a battery boost circuit.
Figure 1C:
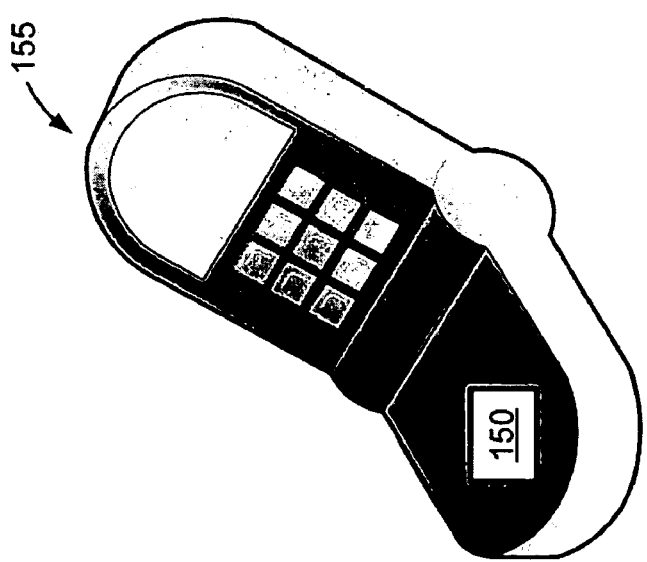
FIG. 1C is an illustration of an exemplary embodiment of a cellular telephone that comprises a battery boost circuit.

For example, FIG. 1C illustrates an exemplary embodiment in which a cellular telephone 155 comprises circuitry 150 (see FIG. 1B) that provides boosted electrical power. Meanwhile, FIG. 1D illustrates an exemplary embodiment in which the circuitry 150 boosts electrical power to a handheld communication or computing device 160. In the exemplary embodiment illustrated in FIG. 1E, the circuitry 150 provides a digital camera 165 with an enhanced supply of electrical power to meet surge requirements, such as in connection with operating the camera's flash lamp.

Thus, a starter motor 110 for an internal combustion engine is but one example of a device that intermittently draws a high level of current. The disclosed technology can benefit many other known devices that similarly have sporadic power characteristics.

Referring now to FIG. 1B, the circuit 100 places the supercapacitor module 105 in a series arrangement with the battery 115, with the supercapacitor module 105 connected directly between the starter contactor 125 and the battery's positive terminal 130. That is, the electrical elements are connected generally in line with one another so that the respective voltages add (or subtract). Meanwhile, the currents of the series elements are essentially uniform, essentially consistent, or have essentially the same values.

Associated with the supercapacitor 120, the supercapacitor module 105 comprises a DC-to-DC converter 135 of the voltage boost type that can be referred to as a converter controller 135. The module 105 further comprises: a capability for controlling the output voltage of the converter controller 135; a solenoid contactor 140; and a capability for controlling the contactor 140 based on voltages present across the supercapacitor 120. Via these control capabilities, the solenoid contactor 140 is responsive to the value of the voltage across the supercapacitor 120. The contactor 140 closes (allows electricity to flow) when the voltage across the supercapacitor 120 meets a predetermined criterion. Meeting the predetermined criterion typically comprises the voltage decreasing to near zero, or a slightly negative value. However, in another exemplary embodiment, the criterion may comprise a non-zero voltage range.

Closure of the contacts of the solenoid contactor 140 allows the battery 115 to directly connect to the starter motor 110 so that engine cranking can continue if the supercapacitor 120 fully discharges, thereby avoiding reverse charging of the supercapacitor 120. Normally, the engine starts prior to full discharge of the supercapacitor 120. In various embodiments, the solenoid contactor 140 can comprise a high current contactor, a relay, or an electrically activated switch, for example.

The converter controller 135 recharges the supercapacitor 120 after each use, typically a starting cycle that may entail a partial or a full discharge. In an exemplary embodiment, the converter controller 135 is economically designed to provide a reasonable current level sufficient to recharge the supercapacitor 120, typically over a period of minutes or several minutes. In other words, the supercapacitor module 105 typically controls the recharge rate of the supercapacitor 120 in a manner that is efficient and economically advantageous, from the perspectives of component cost and usage. In many situations, charging over one or more minutes provides advantages over charging in several seconds.

In an exemplary embodiment of the circuit 100, the supercapacitor 120 and the solenoid contactor 140 are commercially available components. However, the converter controller 135, which may be viewed as a DC-to-DC converter system or as a boost converter system, can be a specifically designed, configured, or optimized for the circuit 100.

Figure 2:
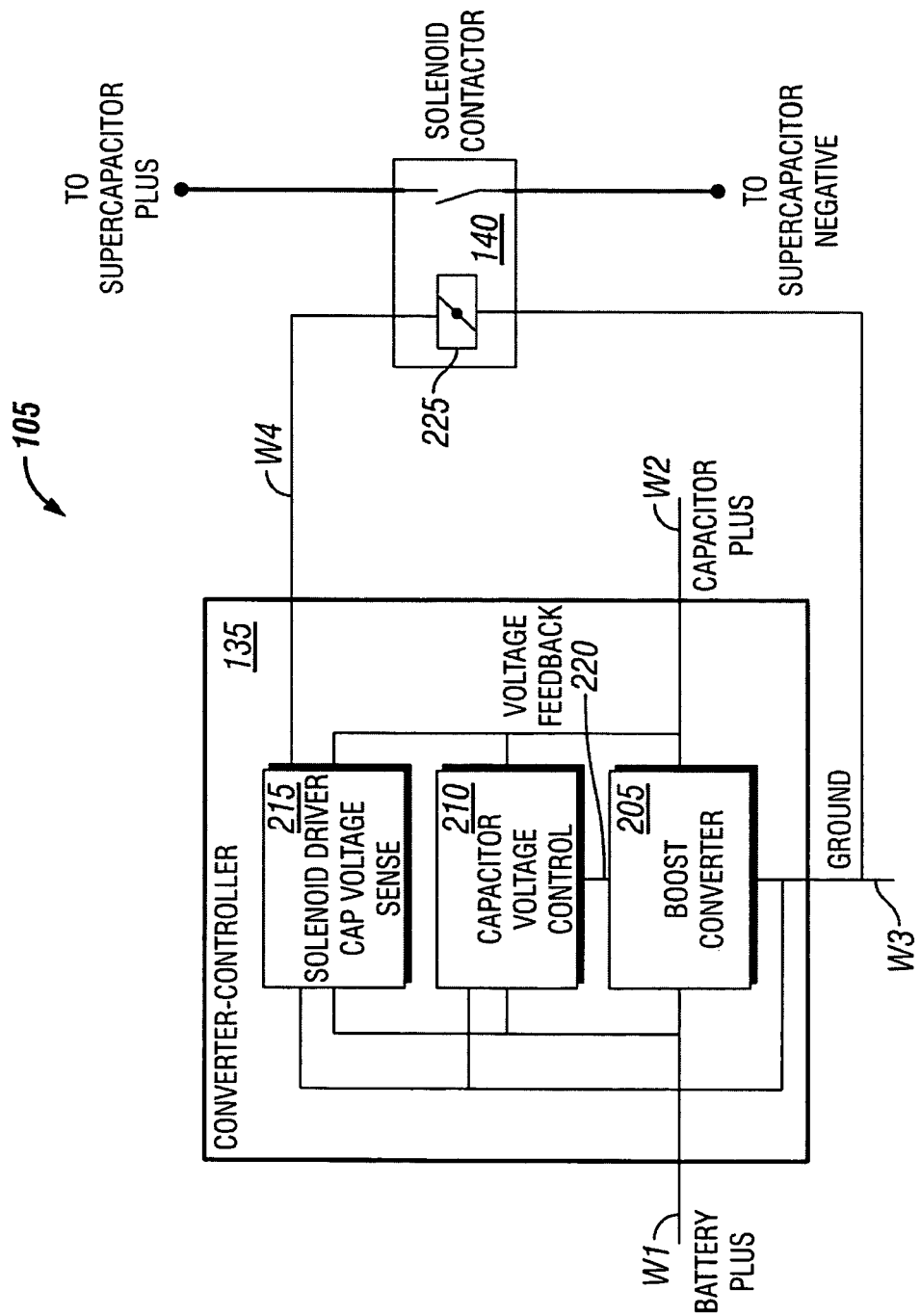
FIG. 2 is a functional block diagram illustration of an exemplary controller of a battery boost circuit.

FIG. 2 illustrates exemplary circuitry of the supercapacitor module 105 in block diagram form and depicts an exemplary embodiment of the converter controller 135. The illustrated converter controller 135 of FIG. 3 comprises three subsystems: a switching boost converter 205; a voltage controller 210; and a solenoid driver 215. The voltage controller 210 maintains the voltage drop across the supercapacitor 120 in its fully charged state. The solenoid driver 215 operates the solenoid contactor 140 when the supercapacitor 120 reaches a substantially discharged state.

The conductors (typically traces on a printed circuit board, electrical connections, or wires) labeled "W1", "W2", "W3", and "W4" of FIG. 2 correspond to the like-denoted elements in FIG. 1B. These connections W1, W2, W3, W4 provide electrical conductivity for sensing inputs and for outputting signals or electricity to support the described functions.

In an exemplary embodiment, the boost converter 205 can be an off-the-shelf component or some electrical device that performs a function similar to a commercially available boost converter, as will be appreciated by those skilled in the art having benefit of the present disclosure. More generally, the boost converter 205 receives one voltage and outputs another, typically different voltage. The output voltage can be viewed as a regulated, a controlled, or a selected voltage.

The boost converter 205 can comprise an inductor, a semiconductor switch, a diode, an output capacitor, and a controller. The controller can operate the semiconductor switch in response to output voltage and output current conditions. PowerStream Technology of Orem Utah distributes a suitable boost converter 205, specifically Model Number PST-DU700 manufactured by Neuron Electronics, Limited of Hong Kong, China. The circuitry 105 of FIG. 2 is configured for the PowerStream product, which is but one example of a suitable component.

Figure 3:
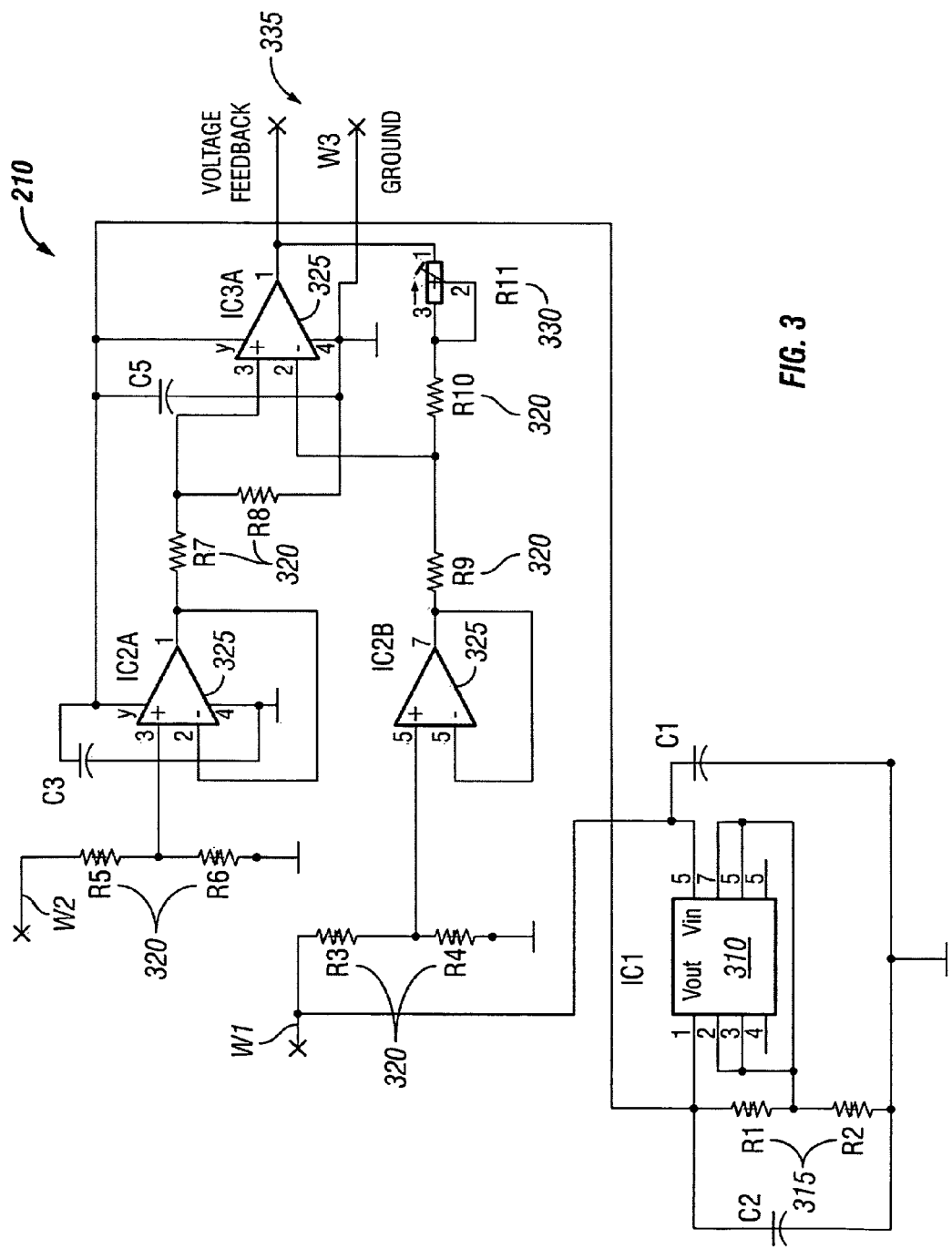
FIG. 3 is a schematic illustration of an exemplary circuit for controlling an output of a boost converter that a battery boost circuit can comprise.

The PowerStream boost converter 205, which is exemplary rather than limiting, delivers its output voltage control (feedback voltage) to a node between two resistors that are not explicitly illustrated in FIG. 2. The node controls at a voltage reference of 5.0 volts DC. The circuit of FIG. 3 connects to that node and thereby provides appropriate output voltage control of the boost converter 205. More specifically, FIG. 3 illustrates an exemplary circuit embodiment of the capacitor voltage control 210 that FIG. 2 illustrates in block diagram form.

The illustrated circuit 210 controls the output voltage of the boost converter 205 relative to ground so that the difference between the converter's output voltage relative to ground and the converter's input voltage relative to ground is a fixed value. That output voltage establishes the voltage across the supercapacitor 120. Thus, rather than charging the supercapacitor 120 to a fixed voltage relative to ground, the boost converter 205 provides the supercapacitor 120 with a relative voltage, based on a voltage differential.

The circuit 210 provides a difference amplifier with gain chosen so that the output of the integrated circuit IC3A 305 is 5.0 volts DC when the voltage difference between inputs W2 and W1 is exactly 5.0 volts DC or within some acceptable tolerance range thereof. In this example, 5.0 volts is the desired charging voltage of the supercapacitor. Conductor W1 connects to the battery terminal voltage, and conductor W2 connects to the supercapacitor terminal voltage.

Integrated circuit IC1 310 is a voltage regulator, such as the voltage regulator that Fairchild Semiconductor offers under the designator "LM7805." The resistors 315 have values R1=1K and R2=5K, which are values chosen so that the output voltage Vout is equal to 6.0 volts. In order to effect the desired operation in this example, the resistors 320 are chosen as follows: R3=R5=4.2K; R4=R6=1.1K; R7=R9=1K; R8=5K; R10=4.2K; and R11=1K. The integrated circuits IC2A, IC2B, and IC3A 325 are typical operational amplifiers such as the device that Texas Instruments markets under the component identifier "OPA2234."

The potentiometer R11 330 facilitates adjusting the overall gain of the circuit 210 so that a differential voltage of 5.0 volts on the input corresponds essentially exactly to the desired 5.0 volt output to the boost converter voltage feedback control node. A typical resistance of the resistor/potentiometer R11 330 is 1K.

The connections 335, labeled "voltage feedback" and "W3 ground" connect respectively to the control node of the boost converter control 220, as shown in FIG. 2 and discussed above, and to ground. A connection is made from W3 335 to the ground of the boost converter 205, which can be effected by connecting either to the negative input terminal or the negative output terminal 220 since they are the common ground node.

Figure 4:
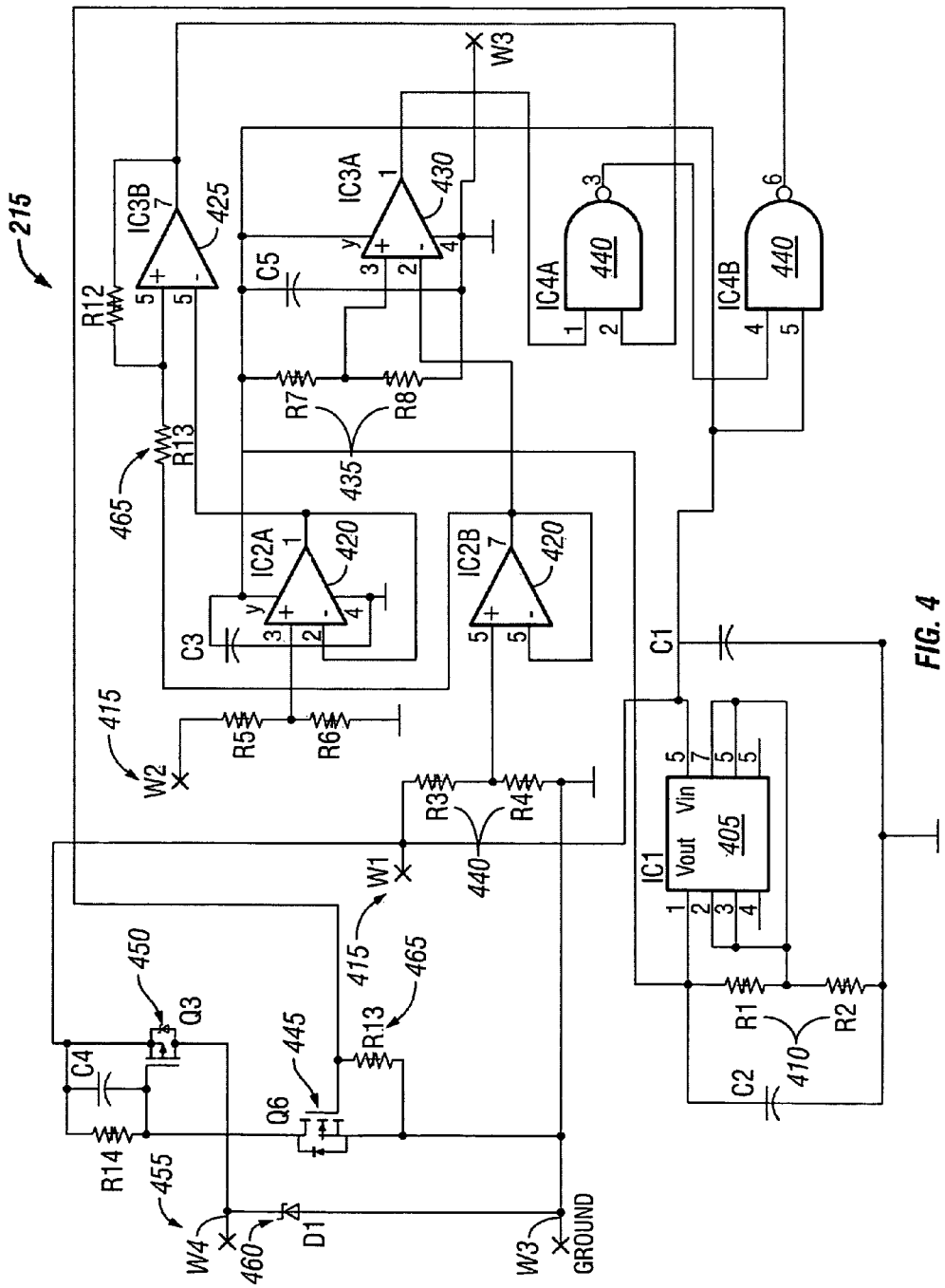
FIG. 4 is a schematic illustration of an exemplary circuit for engaging or controlling a solenoid contactor of a battery boost circuit.

When the supercapacitor 120 completely discharges, resulting from high current delivered to the starter motor 110 during engine starting, the solenoid contactor 140 operates to bypass the supercapacitor 120. This action avoids reverse charging the supercapacitor 120 and permits continued, unrestricted draw of current from the battery 115. When the high current draw ceases, the solenoid contactor 140 disconnects (transitions to an open circuit condition). FIG. 4 illustrates an exemplary circuit 215 that operates the solenoid contactor 140 to implement these functions. More specifically, FIG. 4 illustrates a circuit 215 that exemplarily embodies the solenoid driver 215 that FIG. 3 illustrates in block diagram form, as discussed above.

The coil 225 of the solenoid contactor 140 connects to the terminals W3 and W4 of the circuit 415. The integrated circuit IC1 405 is a voltage regulator that provides a stable supply voltage. In this example, the resistors R1 and R2 410 are chosen so that Vout is 5.0 volts DC.

In operation, the connections W1 and W2 415 sense voltage across the supercapacitor 120. The two voltages of these connections 415 apply to the inputs of voltage followers IC2A and IC2B 420. The outputs of those voltage followers 420 transmit to the comparator IC3B 425. The output of IC3B 425 switches high when the inputs match, which occurs when the voltage difference between W2 and W1 415 drops to zero. That transition to high occurs when the supercapacitor 120 becomes fully discharged.

The output of IC2B 420 also transmits to one input of the comparator IC3A 430. The other input of comparator IC3A 430 references to a fixed voltage via the resistor network R7 and R8 435. The values of the resistor network 435 as well as the values of R3 and R4 440 are typically selected so that the output of comparator IC3A 430 switches high when the voltage at the terminal W1 415 (the battery terminal voltage), drops below approximately 11 volts DC. Such a voltage drop regularly occurs when the battery 115 delivers high current. Therefore, the output of the comparator IC3A 430 is high during engine starting, when a high level of current is being delivered to the starter motor 110.

Accordingly, the output states of comparator IC3B 425 and comparator IC3A 430 specify the conditions for operating the solenoid 225 of the solenoid contactor 140. More specifically, when the outputs of comparator IC3B 425 and comparator IC3A 430 are both high, the solenoid 225 energizes to engage the solenoid contactor 140.

These two high states are ANDed logically by action of the two NAND gates IC4A and IC4B 440. The circuit 215 applies the high output of the comparator IC4B 425 to the gate of the MOSFET Q6 445, turning it on. In turn, the gate of the MOSFET Q3 450 is pulled to ground and MOSFET Q3 450 is turned on, which supplies battery voltage directly to terminal W4 455, activating the solenoid 225 and the associated solenoid contactor 140.

Diode D1 460 clamps negative voltage spikes generated by the inductance of the solenoid contactor 140 when it is turned off. In the example circuit 215, diode D1 can be a component available from multiple commercial sources under the designation "MBRS3100." Likewise, exemplary components for MOSFET Q6 445 and MOSFET Q3 450 are readily available under the respective industry designators "BS170" and "NTD2955," and integrated circuits IC2 and IC3 420 are available under the identifier "OPA2234." Finally, the integrated circuits IC4A and IC4B 440 can be sourced via the code "CD74HC00."

The following resistor values provide operation as desired in this example: R3=R5=4.2K; R4=R6=1.1K; R7=2K; R8=1.1K; R15=10K; R14=100K; R1=0; and R2=5K. The resistors R13 and R12 465 are chosen so that the comparator IC3A 430 exhibits a certain amount of hysteresis. Values R13=50K and R12=1M are sufficient to assure that the comparator 430 positively changes state and avoids oscillation. The hysteresis typically causes the supercapacitor 120 to slightly reverse charge, but less than a few tenths of a volt prior to solenoid operation.

Figure 5:
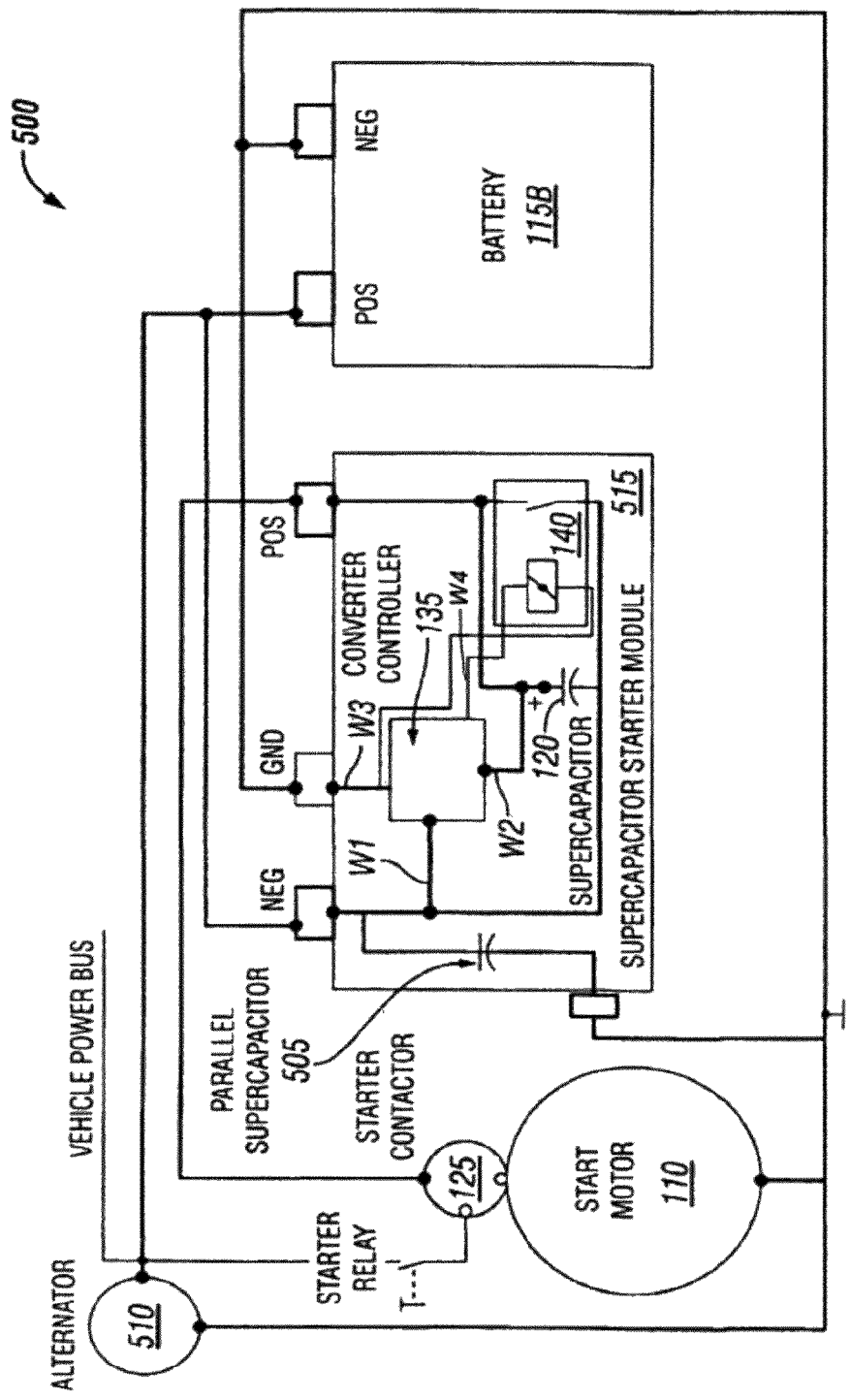
FIG. 5 is an illustration of an exemplary embodiment of a battery boost circuit.

The exemplary battery boost circuit 100 discussed above and described in FIGS. 1, 2, 3, and 4 can be modified and/or adapted according to various applications, parameters, and performance objectives. For example, FIG. 5 illustrates another exemplary embodiment of a battery boost circuit 500, which will now be discussed.

The circuit 500 (FIG. 5) can be viewed as replacing the battery 115 of the circuit 100 (FIG. 1B) with a parallel arrangement of the battery 115B and the supercapacitor 505. Thus, the circuit 500 comprises the battery 115B (which can be essentially identical to the battery 115 of FIG. 1B) connected in parallel with the supercapacitor 505. In an exemplary embodiment, the remainder of the circuit elements of the battery boost circuit 500 can be essentially the same as the corresponding elements of the battery boost circuit 100, as discussed above with reference to FIGS. 1B, 2, 3, and 4. Relative to the supercapacitor module 105 of FIG. 1B, the supercapacitor module 515 can be adapted to incorporate the parallel supercapacitor 505 in addition to the series supercapacitor 120.

In an exemplary embodiment, the supercapacitor 505 of the battery boost circuit 500 does not need to be isolated, via special isolation circuitry, from the battery 115B or from the vehicle's power bus. Alleviating the isolation constraints, the series supercapacitor 120 provides boost energy and is inherently isolated.

The battery 115B and the alternator system 510 recharge the parallel supercapacitor 505 after each use, typically following discharge in association with starting the vehicle engine. Thus, the parallel supercapacitor 505 can operate without a dedicated DC-to-DC converter to effect recharge.

In operation, the exemplary circuits 100, 500 of FIGS. 1B and 5 concurrently feed energy from the battery 115, 115B and from one or more supercapacitors 120, 505 to the starter motor 110 during engine cranking. However, in an alternative embodiment, the starter motor 110 can draw electricity exclusively from one or more supercapacitors 120, 505 during engine cranking. Meanwhile, the battery 115C (and/or the alternator system 510) can recharge the supercapacitors 120, 505 in preparation for another cranking cycle.

Figure 6:
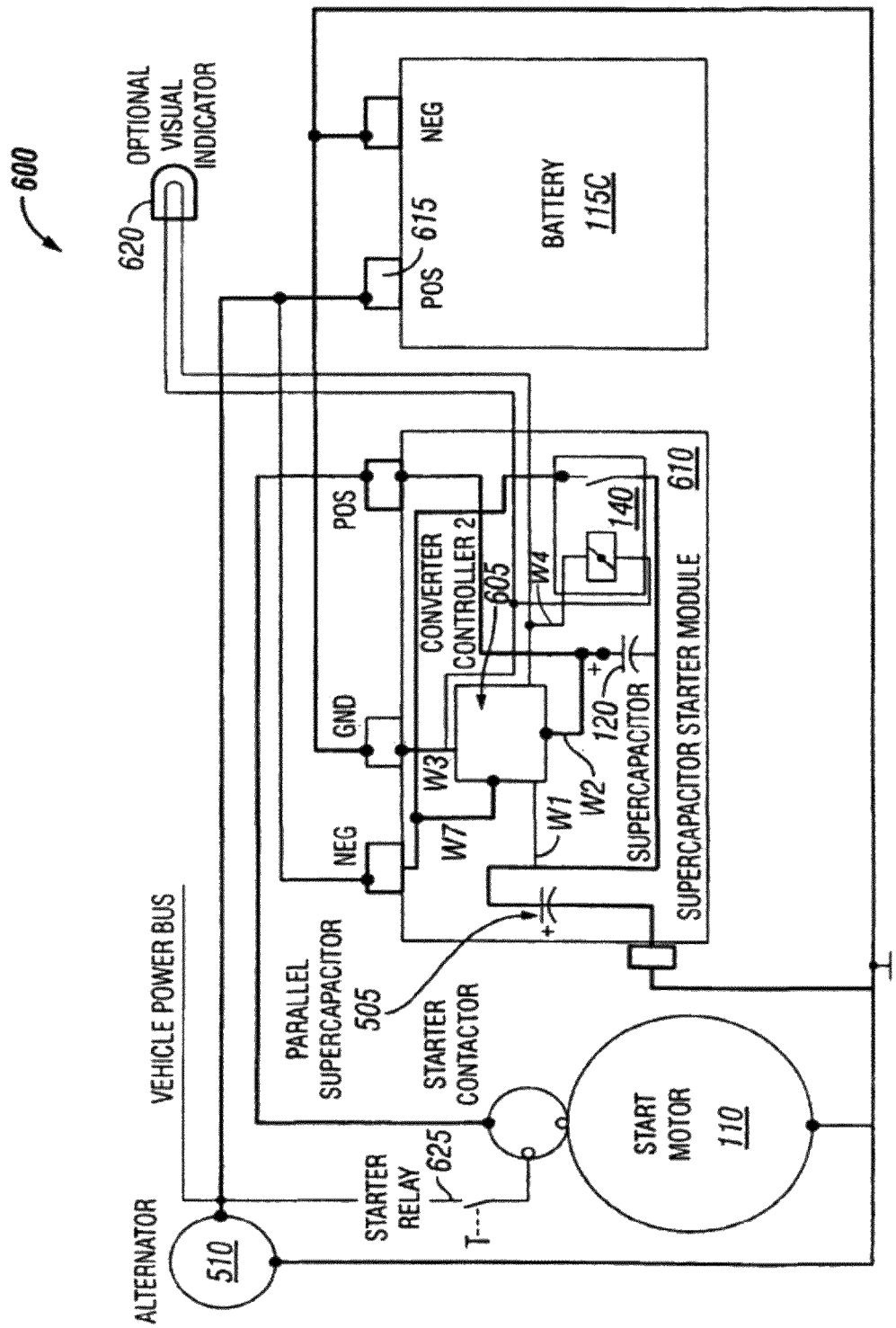
FIG. 6 is an illustration of an exemplary embodiment of a battery boost circuit.

FIG. 6 illustrates such an exemplary embodiment, in the form of the battery boost circuit 600 that comprises the supercapacitor module 610. The illustrated battery boost circuit 600 comprises the supercapacitor 120 disposed in a series arrangement and the supercapacitor 505 disposed in a parallel arrangement. Those two supercapacitors 120, 505 together power the starter motor 110. Relieved from providing surge current for starter motor, the battery 115C can be a deep cycle battery that would not be suited otherwise suited for the vehicular starting applications.

The circuit 600 electrically removes or disconnects the battery 115 during the starting event unless the terminal voltage of the parallel supercapacitor 505 drops below a threshold level. If the terminal voltage of the supercapacitor 505 does drop below the threshold, then the supercapacitor 505 may have insufficient energy, in which case the solenoid contactor 140 operates to tap energy from the battery 115C to recharge the supercapacitor 505.

Rather than operating to bypass the series supercapacitor 120, per the aforementioned circuit 500 of FIG. 5, the solenoid contactor 140 performs a somewhat different function in the circuit 600. In the circuit 600, the solenoid contactor 140 isolates the parallel supercapacitor 505 from the battery 115C until recharging is needed. Thus, the battery 115C can be electrically isolated from the supercapacitors 120, 505 during cranking.

While having a similar architecture to and sharing many elements of the embodiments discussed above, the exemplary circuit 600 has an additional conductor connection W7 that is used to operate the solenoid contactor 140. The circuit 600 uses the sensed voltage on connection W1 to determine actuation of the solenoid contactor 140. Triggered by appropriate voltage conditions, the solenoid contactor 140 closes (makes an electrical connection) and thereby recharges the parallel supercapacitor 505. The triggering voltage conditions typically comprise a voltage decrease indicative of drawing current for vehicle starting. At other times, the solenoid contactor 140 remains inactive, and the parallel supercapacitor 505 is isolated from the battery bus. The series supercapacitor 120 of the circuit 600 operates in a manner generally consistent with circuit embodiments discussed above with reference to FIGS. 1B, 2, 3, 4, and 5.

Figure 7:
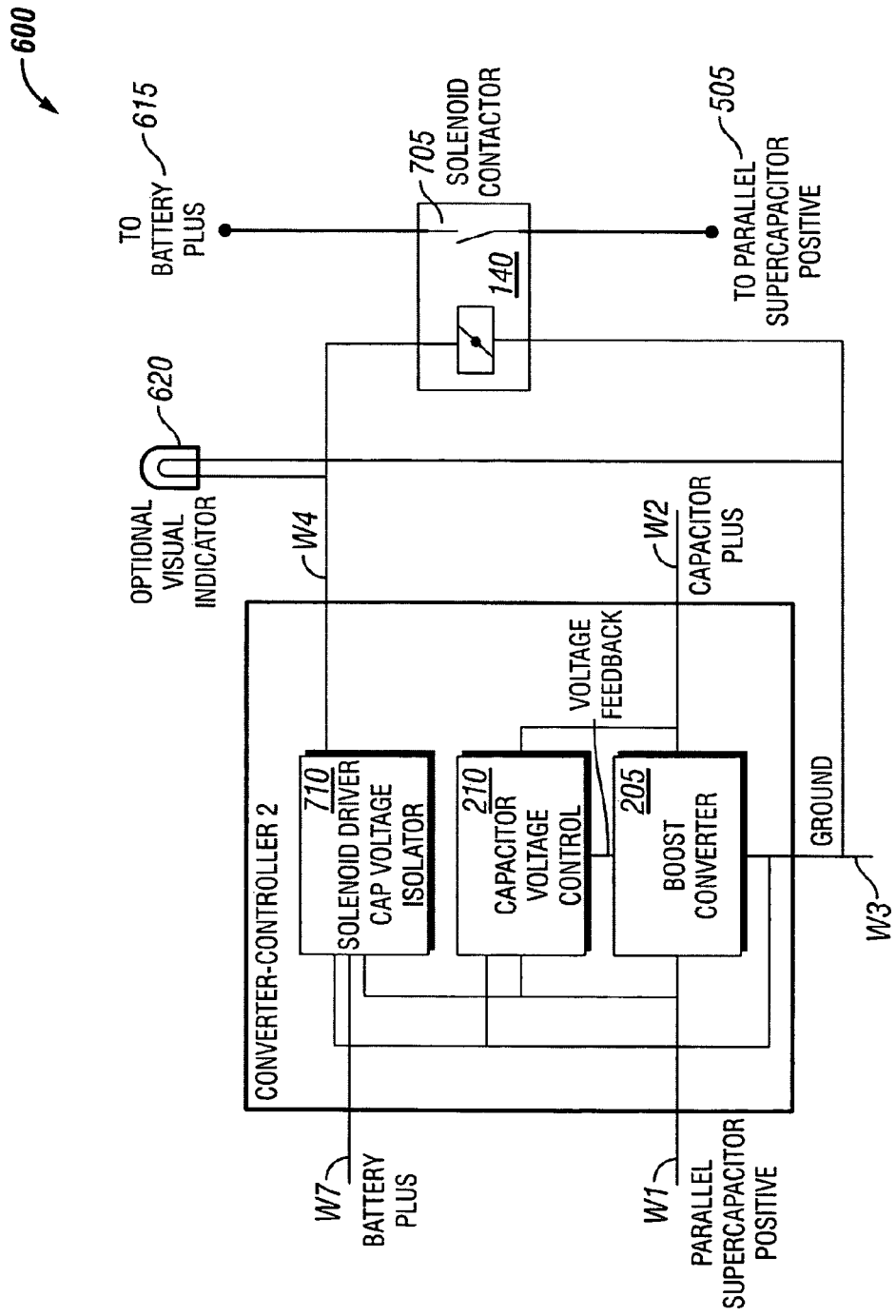
FIG. 7 is a functional block diagram illustration of an exemplary controller of a battery boost circuit.

FIG. 7 illustrates circuitry of the supercapacitor module 610, including a functional block diagram of the converter controller 605 of the battery boost circuit 600 of FIG. 6. The contacts 705 of the solenoid contactor 140 are configured as shown in FIG. 7. More specifically, one contact side connects electrically to the battery's plus terminal 615, while the other side connects to the positive (high voltage side) of the parallel supercapacitor 505.

The subsystem 710, labeled "solenoid driver cap voltage isolator" functions somewhat differently from the aforementioned solenoid driver 215 that FIG. 2 illustrates as discussed above. The solenoid driver 710 typically does not actuate the solenoid contactor 140 until or unless the voltage across the parallel supercapacitor 505 drops below a set or predetermined value that may be greater than zero volts. In other words, the criterion for closing the solenoid contactor 140 can be having a supercapacitor voltage that is in a range substantially above zero volts, as an alternative to that voltage being essentially zero.

The optional visual indicator 620 can advantageously alert the user (for example a driver or a vehicle operator) whenever the parallel supercapacitor 505 is being recharged, that is, whenever the solenoid contactor 140 is actuated to close the contacts 705. The indicator 620 can comprise a light, a light emitting diode, an illuminated text message, or an audible signal, for example.

Figure 8:
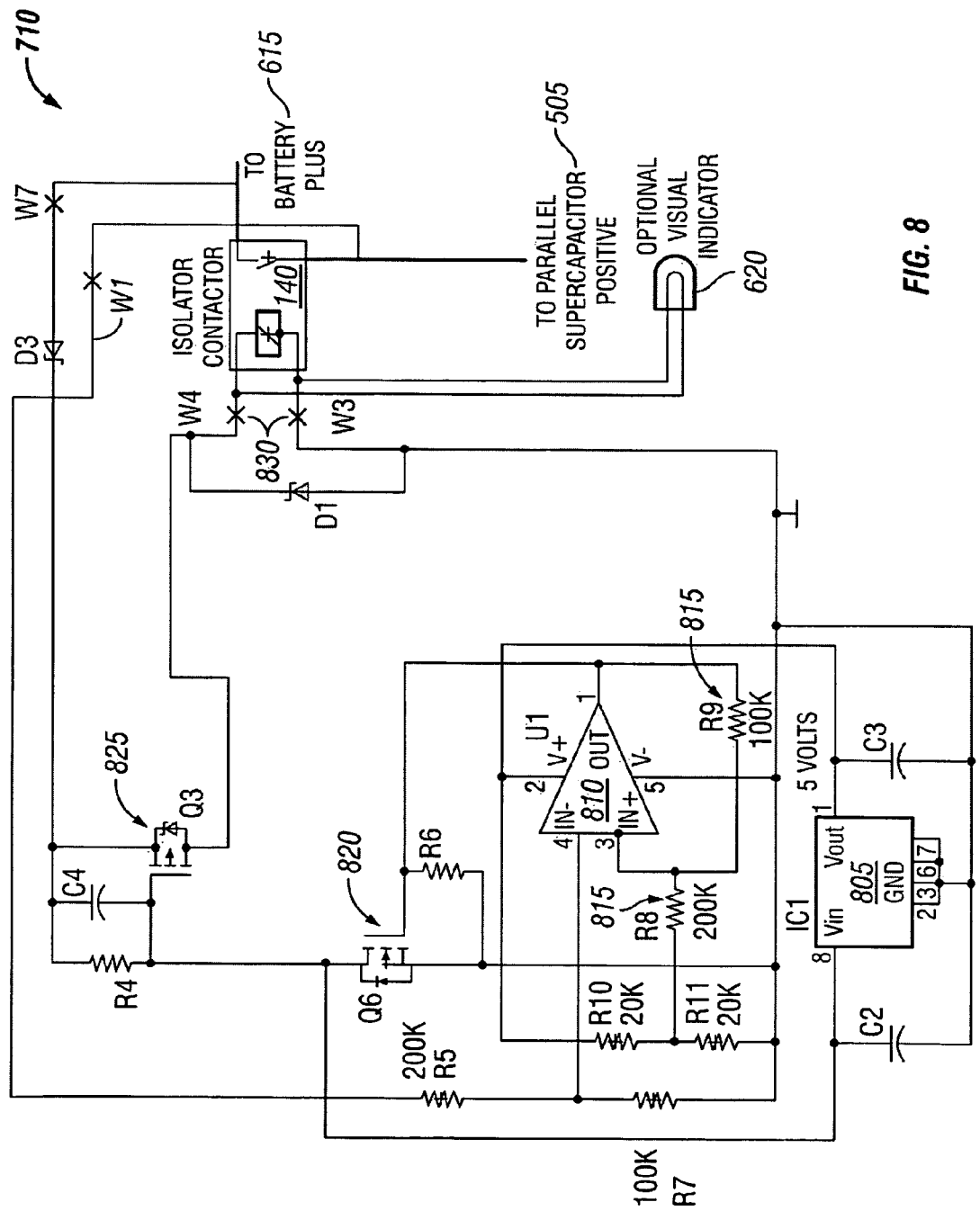
FIG. 8 is a schematic illustration of an exemplary circuit for engaging or controlling a solenoid contactor of a battery boost circuit.

FIG. 8 schematically illustrates an exemplary embodiment of a circuit 710 that controls the solenoid contactor 140 via the aforementioned conditions or criteria. That is, the circuit 710 of FIG. 8 provides an exemplary implementation of the solenoid driver 710 that FIG. 7 illustrates as a block diagram element.

The circuit 710 of FIG. 8 engages the solenoid contactor 140 when the voltage sensed at the terminal W1 drops below 9.5 volts. Closing the solenoid contactor 140 recharges the parallel supercapacitor 505 by connecting the positive terminal 615 of the battery 115C to the positive (high voltage) side of the parallel supercapacitor 505.

The circuit 710 deactivates (electrically opens) the solenoid contactor 140 when the voltage at the terminal W1 rises above 12.5 volts. These voltage thresholds are a function of the choices of resistance values for the resistors R5, R7, R10, R11, R8, and R9 in combination with the regulated voltage value "Vout" from the integrated circuit IC1 805, which is 5.0 volts. Accordingly, the thresholds and the criteria for operating the solenoid contactor 140 can be readily adapted in accordance with various applications, performance objectives, and preferences.

The operational amplifier U1 810 operates as a comparator having hysteresis, with the resistance values of the resistors R8 and R9 determining the level of hysteresis. The output of the operational amplifier U1 810 feeds and operates the MOSFET switch Q6 820, which in turn controls the solid state switch Q3 825. A high output from the operational amplifier U1 810 turns the switch Q3 825 on. Voltage from the battery's positive terminal 615 is applied to the armature of the solenoid contactor 140 through terminals W4 and W3 830.

The circuit implementation 710 of FIG. 8 may have a propensity to actuate the solenoid contactor 140, and thereby connect the battery 115C to the parallel supercapacitor 505, while starting is in progress. If this event occurs and the user continues cranking the engine with the solenoid contactor 140 actuated, the series supercapacitor 120 can become reverse charged. To reduce the possibility of this unwanted situation, the optional visual indicator 620 alerts the user or vehicle driver to cease cranking until the indicator 620 turns off or resets. The indicator 620 turning off indicates that the parallel supercapacitor 505 is fully recharged, and thus prepared for engine cranking. During any short time that the indicator 620 may be active, the boost converter 205 substantially recharges the series supercapacitor 120 so that cranking can resume.

It will be appreciated that the circuit embodiment 710 of FIG. 8 is but one example of various circuits that may effect or embody the functions of a system that drives a solenoid contactor and isolates supercapacitor voltage. That is, the illustrated embodiment is exemplary, and those having skill in the art and the benefit of the present disclosure may create other circuit embodiments based on the present disclosure and teaching present in textual and graphic form. For example, in one alternative exemplary embodiment, a circuit may operate the solenoid contactor 140 only when cranking is not in progress. In yet another exemplary embodiment, a control circuit can automatically override a user's cranking attempts while and until the parallel supercapacitor 120 recharges. With such an overriding capability, the visual indicator 620 may be redundant, and thus eliminated.

Figure 9:
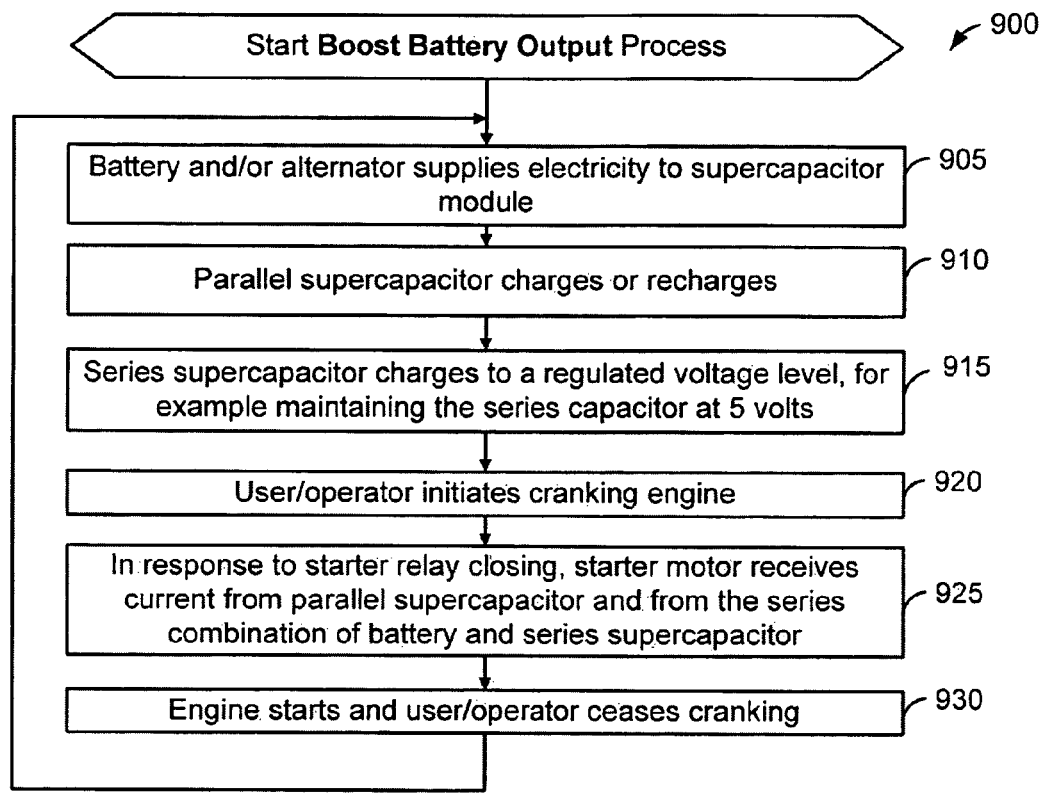
FIG. 9 is flowchart of an exemplary process for boosting output of a battery.

An exemplary Process 900 for boosting output of a battery will now be described with reference to FIG. 9, which illustrates a flowchart of the Process 900. While generally applicable to other embodiments, Process 900 will be discussed with exemplary reference to FIG. 6.

At Step 905 of Process 900, the supercapacitor module 610 is connected to the battery 115C and thus to the alternator system 510 of a vehicle 101. Accordingly, the supercapacitor module 610 can access electrical power on an as-needed basis to maintain an appropriate supply of energy in the parallel supercapacitor 505 and the series supercapacitor 120. The voltages of each of those supercapacitors 505, 120 (typically measured across the terminals) generally provides an indication of the stored charge or of the available energy in each device.

The supercapacitor 505 and the supercapacitor 120 may be respectively referred to as "parallel" and "series" as descriptive of their general configurations in the circuit 600, rather than to indicate that either comprises any inherent or integral feature that distinguishes one from the other.

At Step 910, the battery 115C charges (or recharges) the parallel supercapacitor 505. In one exemplary embodiment, the parallel supercapacitor 505 is charged to a regulated level that may be different than the voltage of the battery 115C. In an alternative exemplary embodiment, the parallel supercapacitor 505 may be charged until its voltage is essentially equal to the voltage of the battery 115C.

At Step 915, the boost converter 605 supplies current to the series supercapacitor 120 based upon voltage across that supercapacitor 120. For example, the boost convert 605 can keep the series supercapacitor 120 charged to 5 volts. Thus, the voltage controller 210 can maintain the series supercapacitor 120 at a voltage that is substantially less than the battery's voltage and that avoids exceeding the voltage rating of the supercapacitor 120.

At Step 920, the driver, operator, or user attempts to start the engine, typically via turning an ignition key or providing some other input or prompt.

At Step 925, in response to the input or to some other trigger event, the starter relay 625 closes thereby applying voltage and current to the starter motor 110. The circuit 600 applies to the starter motor 110 a level of voltage essentially equal to the voltage of the series supercapacitor 120 added to the voltage of the battery 115C. Those combined voltages are typically less than twice the voltage of the battery 115C. The starter motor 110 further receives current from the parallel supercapacitor 505.

At Step 930, in response to the applied voltage and current, the starter motor 110 cranks the engine and then disengages when the engine begins running independently. Following Step 930, Process 900 loops back to Step 905 and iterates. Thus, the supercapacitors 505, 120 recharge in preparation for cranking the engine again.

Figure 10:
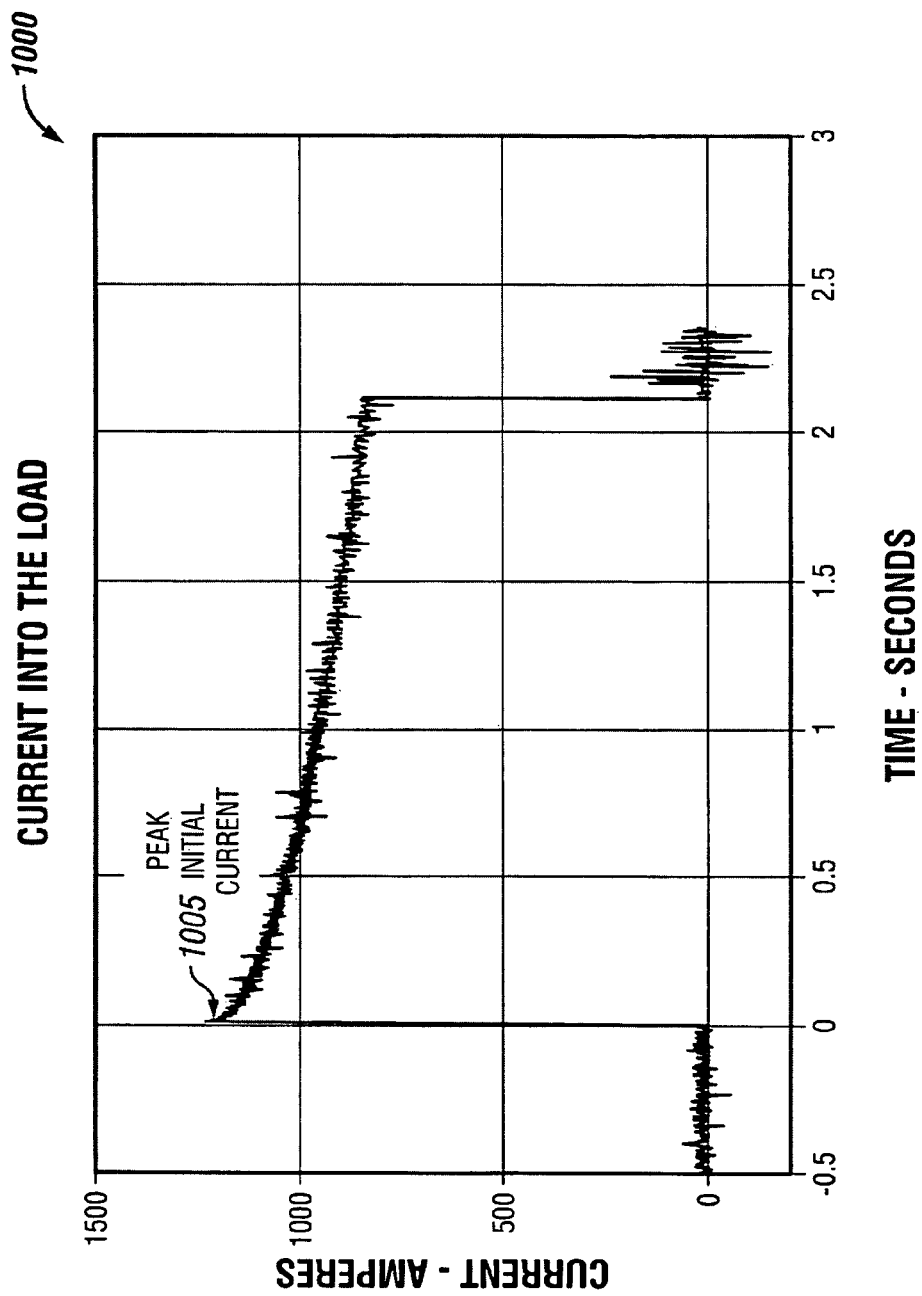
FIG. 10 is a plot illustrating current characteristics of an exemplary battery boost circuit.
Figure 11:
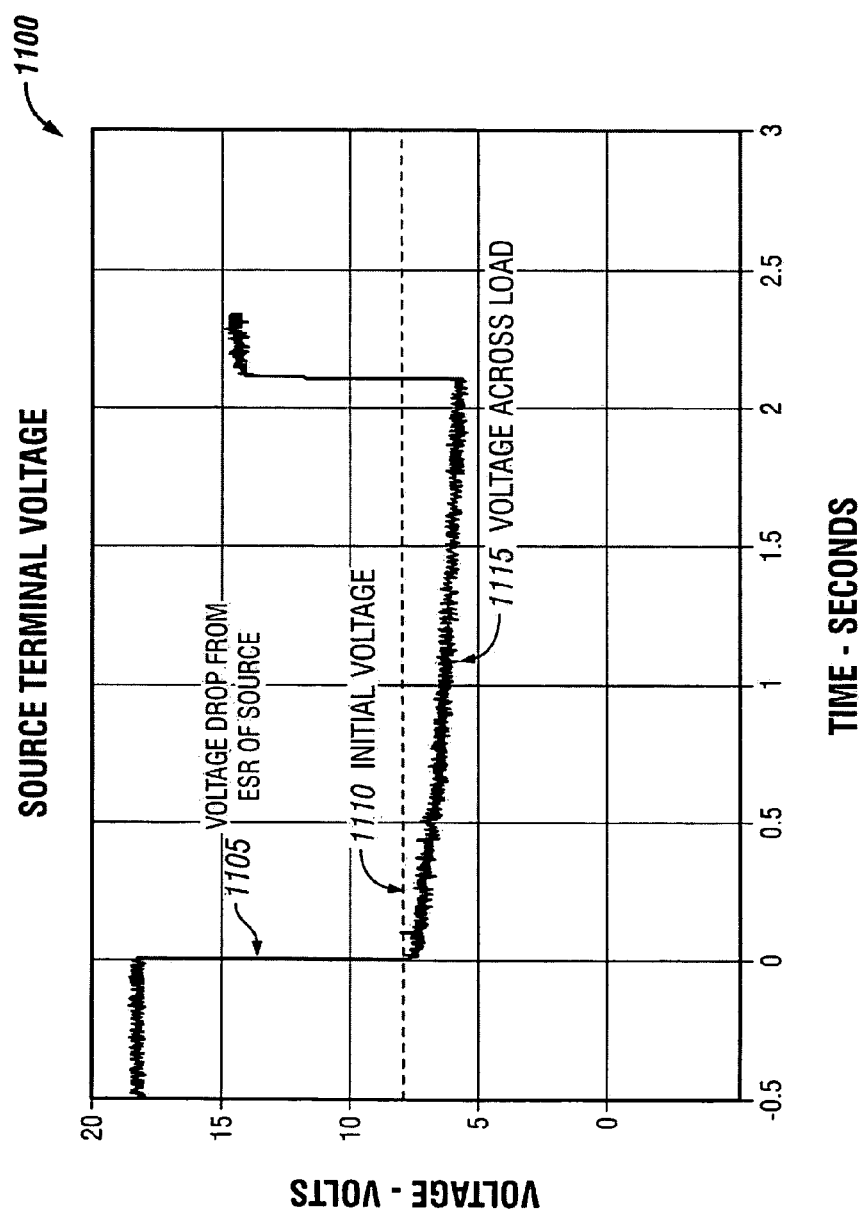
FIG. 11 is a plot illustrating voltage characteristics of an exemplary battery boost circuit.

Results of laboratory testing of an exemplary embodiment of a battery boost circuit, configured in accordance with the foregoing discussion, will now be discussed. FIGS. 10 and 11 provide experimental data plots acquired from dynamic testing of physical test circuits subjected to conditions that simulate operation in a vehicle 101. Table 1, discussed and shown below, provides a summary of testing results for three experimental circuit embodiments.

Each experimental circuit configuration was discharged for a minimum time of two seconds into a fixed resistance load. The tests approximate the electrical loading conditions of an actual starting motor coupled to an internal combustion engine. Testing activities included measuring current and the terminal voltage (at the load) with an oscilloscope. The direct measurements together with common computational analyses of acquired data yielded comparative performance results.

Three circuits were built and tested for performance. As discussed in further detail below, a comparison of the testing results of these three circuits demonstrates significant advantages that the boost technology disclosed herein achieves. The three circuits were configured to have deliberate similarities and deliberate differences intended to support fair performance comparisons.

The first of the three tested circuits had a battery connected to a load. For the second tested circuit, a supercapacitor was added in parallel with the battery. Thus, the second circuit comprised the battery and a supercapacitor, each connected in parallel with the load. The third tested circuit, which demonstrated unexpected performance relative to the other two circuits, placed the supercapacitor and the battery in series with the load.

All three tested circuits incorporated the same battery, a Power Sonic Model PS-12550, 12 volt, 55.0 amp-hr, sealed cell.

The parallel supercapacitor of the second circuit and the series supercapacitor of the third circuit incorporated supercapacitors comprising essentially identical cells. More specifically, the supercapacitors were constructed via connecting individual cells in series with one another. Each cell was an experimental cell constructed with aerogel carbon electrodes and incorporating an organic electrolyte. The cell capacitance after manufacture was determined to be 1600 farads. These cells were designed to withstand a maximum operating voltage of 2.5 volts DC.

The series supercapacitor was constructed by placing two of these cells in a series electrical arrangement. In this way, the series supercapacitor was able to be operated with 5.0 volts DC across it without exceeding the cell rating. The voltage used across the series supercapacitor at the beginning of each test was 5.0 volts.

The parallel supercapacitor was constructed by connecting six of these cells to one another a series electrical arrangement. In this way, the parallel supercapacitor was configured to operate at a terminal voltage of 13.0 volts DC, without exceeding the cell rating. The battery operated at 13.0 volts at the beginning of each test.

FIG. 10 illustrates a current trace acquired with an oscilloscope during testing of the third circuit (parallel supercapacitor). Thus, the graph 1000 is a plot of current that the series-arranged battery and supercapacitor delivered to the load as a function of time.

As indicated by the plotted data, the discharge progressed for at least two seconds. More generally, the tests examined energy and average power transferred to the starter motor-engine load during a starting event lasting two seconds. Engine starts typically occur during the first two seconds, and successful starts result from high energy and power delivered during engine cranking. Besides the current-time trace itself, the peak initial current 1005 in the plot 1000 of FIG. 10 is noteworthy, as shall be discussed in further detail below.

FIG. 11 illustrates the corresponding source terminal voltage trace collected during testing of the same circuit. That is, the plot 1100 of FIG. 11 illustrates voltage as a function of time that the test circuit delivered to the load. Accordingly, the third test circuit, comprising a series arrangement of a supercapacitor and a battery, delivered electrical power according to the current of FIG. 10 and the voltage of FIG. 11.

At time=0 seconds, current flows (FIG. 10) and initial voltage drops 1105 (FIG. 11). As one skilled in the art having the benefit of this disclosure will appreciate, the values of initial voltage, voltage drop, and peak initial current allow straightforward computation of the equivalent series resistance (ESR) of the voltage source and the resistance of the load. Additionally, the peak power being transferred to the load occurs at this instance (time=0), and peak power is the mathematical product of the initial voltage 1110 and the peak initial current 1005. That is, power at time=0 is initial voltage multiplied by peak initial current.

The energy that is transferred to the load during the two-second time period is the time integral of the voltage across the load 1115 multiplied by the current into the load. In other words, summing power delivered during the test cycle indicates total energy delivery. The energy that is dissipated as heat in the ESR of the source is the time integral during the two seconds of the product of the current squared and the value of ESR that has been computed.

Table 1, immediately below, lists a summary of the testing results for the three tested circuits.

The series supercapacitor of the third tested circuit (second row of Table 1, labeled "$3^{rd}$ Circuit: Series capacitor and battery") operates generally in accordance with the series supercapacitors 120 of the circuits 100, 500, and 600 that FIGS. 1B, 5, and 6 respectively illustrate. When compared to the first and second circuits, the tested performance of the third circuit demonstrates the unexpectedly enhanced performance of the circuits 100, 500, and 600, discussed above.

The testing data collected from the first, "Battery only" circuit (first row of Table 1) indicates the performance of a starting event without assistance from a supercapacitor. The testing data collected from the second, "Battery with parallel capacitor" data demonstrates a performance benefit relative to the first, "Battery only" circuit. The following description summarizes specific, unexpected benefits of the series supercapacitor arrangement.

Peak initial current: The torque a starting motor can deliver to turning the engine is directly proportional to current. Relative to the first circuit (battery only), the third circuit (series supercapacitor) provides approximately 20% greater current, which is similar to what the second circuit (parallel supercapacitor) provides.

Initial voltage: Relative to the first circuit (battery only), the second circuit (parallel supercapacitor) and the third circuit (series supercapacitor) each provides approximately 20% greater initial voltage.

Peak power: As shown in Table 1, the second circuit (parallel supercapacitor) and the third circuit (series supercapacitor) each supplies approximately 40% higher peak power than the first circuit (battery only).

Total energy dissipated during the two second starting event: The total dissipated energy is the sum of the energy delivered to the load and the energy dissipated as heat within the ESR of the source. These two energies are respectively labeled in Table 1 as "Load energy to 2 seconds" and "Total energy in ESR in 2 seconds."

TABLE 1

| Description of Tested Circuit | Source Terminal Voltage (volts) | Battery Voltage (volts) | Peak Initial Current (amps) | Initial Voltage (volts) | Peak Power (KW) | Total Energy Dissipated During 2 Seconds (KJ) | Total Energy Dissipated in ESR 2 Seconds (KJ) |
|---|---|---|---|---|---|---|---|
| $1^{st}$ Circuit: Battery only | 13.2 | 13.2 | 960 | 6.6 | 6.3 | 20.8 | 10.2 |
| $3^{rd}$ Circuit: Series capacitor and battery | 17.9 | 13.0 | 1175 | 8.1 | 9.5 | 28.3 | 15.4 |
| $2^{nd}$ Circuit: Battery with parallel capacitor | 12.8 | 12.8 | 1160 | 8.3 | 9.7 | 22.9 | 7.8 |

| Description of Tested Circuit | Load Energy to 2 Seconds (KJ) | Average Power to 2 Seconds (KW) | Percent Energy to Load Relative to Battery Alone | Load Resist. (mohm) | Total ESR of Source (mohm) |
|---|---|---|---|---|---|
| $1^{st}$ Circuit: Battery only | 10.6 | 5.3 | 100% | 7.13 | 6.88 |
| $3^{rd}$ Circuit: Series capacitor and battery | 12.9 | 6.4 | 121% | 6.97 | 8.34 |
| $2^{nd}$ Circuit: Battery with parallel capacitor | 15.1 | 7.6 | 143% | 7.34 | 3.80 |

The values of "Total Energy Dissipated During 2 Seconds" for the third circuit (series supercapacitor) versus the second circuit (parallel supercapacitor) indicates that the third circuit uses energy somewhat less efficiently than the second circuit. An explanation for this result is that the third circuit (series supercapacitor) passes the high starting current through both the ESR of the series capacitor and the ESR of the battery. Meanwhile, the second circuit (parallel supercapacitor) passes much of the high starting current only though its own ESR, which is generally a value much lower that the ESR of the battery.

However, the appropriate figure of merit for a starting event is not this relative efficiency. Rather the figure of merit is the value of the "Load Energy to 2 Seconds." Inspection of these values combined with inspection of "Percent Energy to Load Relative to Battery Alone" demonstrates that the third circuit (series supercapacitor) transfers approximately 20% greater energy to the load than does the first circuit (battery alone). The second circuit (parallel supercapacitor) transfers approximately 40% greater energy. However, the component costs for a marketable product based on the second circuit (parallel supercapacitor) are much greater than the component costs for a marketable product based on the second circuit (series supercapacitor). In other words, a battery boost circuit that comprises a supercapacitor arranged in series with a battery provides unexpectedly sufficient performance while achieving significant cost advantages.

Load resistance and source ESR: The load resistance values demonstrate that the test loads were nearly identical for the three tests. The source ESR values demonstrate the foregoing principles regarding energy transfer budgets. Batteries typically have high ESR, exemplified in this instance with a value of about 6.9 milliohms. A series supercapacitor adds about 1.5 milliohms, bringing the source ESR for the third circuit (series supercapacitor) up to approximately 8.3 milliohms. Meanwhile, for the second circuit (parallel supercapacitor) the ESR of the parallel supercapacitor together with the parallel ESR of the battery produced the low value of 3.8 milliohms.

The data presented in Table 1 demonstrate unexpectedly improved starting performance of exemplary embodiments of battery boost circuits. It should be clear from the discussion of the testing data that even greater performance can be derived from a configuration that includes the series supercapacitor and the parallel supercapacitor-battery combination. Accordingly, a battery boost circuit comprising a parallel supercapacitor and a series supercapacitor, for example circuit 500 of FIG. 5 or circuit 600 of FIG. 6, provides yet higher performance than the values shown in the Table 1.

A method has been described that includes a step of charging a supercapacitor to a regulated voltage and another step of applying a series combination of the regulated voltage and a power supply voltage to a load. In one exemplary embodiment, the power supply voltage comprises a battery voltage. In one exemplary embodiment, the load comprises a starter motor for an internal combustion engine. In one exemplary embodiment, the load comprises a component of a communication device that consumes power intermittently. In one exemplary embodiment, the step of applying the series combination of the regulated voltage and the power supply voltage to the load comprises charging a flash lamp of a digital camera. In another exemplary embodiment, a handheld device comprises the load. In another exemplary embodiment, a cellular telephone comprises the load. In yet another exemplary embodiment, the step of charging the supercapacitor to the regulated voltage comprises charging the supercapacitor to a selected voltage level that is substantially less than the power supply voltage. In still another exemplary embodiment, the step of charging the supercapacitor to the regulated voltage comprises maintaining the regulated voltage at a specified level independent of a fluctuation in the power supply voltage.

A method has also been described that includes a step of maintaining a first voltage on a supercapacitor via transferring energy from a battery, having a second voltage, to the supercapacitor, wherein the first voltage is substantially lower than the second voltage. That described method further includes a step of connecting the battery and the supercapacitor in series with a load. In an exemplary embodiment, the step of connecting the battery and the supercapacitor in series with the load comprises applying a sum of the first voltage and the second voltage to the load. In another exemplary embodiment, the step of maintaining the first voltage on the supercapacitor via transferring energy from the battery to the supercapacitor comprises charging the supercapacitor with a means for regulating voltage. In yet another exemplary embodiment, transferring energy from the battery to the supercapacitor comprises a boost converter feeding electricity to the supercapacitor. In one more exemplary embodiment, the maintaining step further comprises maintaining the first voltage on the supercapacitor independent of a fluctuation in the second voltage. In still another exemplary embodiment, the method comprises a step of connecting a second supercapacitor in parallel with the load. In another exemplary embodiment, the load comprises a motor. In a final exemplary embodiment, the load comprises a component of a communication device that draws electrical power on an intermittent basis.

An electrical system has also been described that includes a supercapacitor; a means for charging the supercapacitor to a regulated voltage; and a circuit, comprising the supercapacitor and the means for charging the supercapacitor, for applying a series combination of the regulated voltage and a battery voltage to a load in response to a trigger event. In an exemplary embodiment, the electrical system further comprises a second supercapacitor; the circuit is operable to connect the second supercapacitor in parallel with the load in response to the trigger event; and an occurrence of the trigger event comprises engaging an ignition switch of a vehicle. In another exemplary embodiment, the load comprises a starter for an internal combustion engine; and the means for charging the supercapacitor to a regulated voltage comprises a boost converter.

An apparatus has also been described that includes a means for charging a supercapacitor to a first voltage via regulating a transfer of charge from a battery, having a second voltage, to the supercapacitor; and a means for connecting the charged supercapacitor and the battery in series with a load. In an exemplary embodiment, the first voltage is substantially lower than the second voltage. In another exemplary embodiment, the first voltage is substantially different than the second voltage. In yet another exemplary embodiment, regulating the transfer of charge comprises charging the supercapacitor with a DC-to-DC converter that draws power from the battery. In one exemplary embodiment, the apparatus comprises a cell phone, and the load comprises an element of the cell phone that consumes power intermittently.

A method for starting an engine of a vehicle has also been described. In an exemplary embodiment, the method includes the steps of: applying battery voltage from a battery to a boost converter; applying current from the boost converter to a supercapacitor to maintain the supercapacitor at a regulated voltage level independent of a decline in the battery voltage associated with a cold weather condition; providing a circuit that comprises a series arrangement of: the battery; the supercapacitor; a starter solenoid; and a starter motor; engaging the starter solenoid in response to an operator of the vehicle turning an ignition key; applying a sum of the declined battery voltage and the regulated voltage level to the starter motor in response to the step of engaging the starter solenoid; and rotating the starter motor and starting the engine in response to the step of applying the sum of the declined battery voltage and the regulated voltage level.

A method for energizing a starter motor associated with an engine has been described. An exemplary embodiment of that method includes: providing a battery having a battery voltage that changes in response to environmental conditions; monitoring voltage between terminals of a supercapacitor; maintaining the supercapacitor in a fully charged state via feeding current to the supercapacitor according to feedback from the monitored voltage; connecting the fully charged supercapacitor, the battery, a starter relay, and the starter motor in series with one another; and in response to a user turning an ignition key, closing the starter relay and applying to the starter motor an added combination of the monitored voltage and the voltage that changes in response to environmental conditions.

Also described is an electrical system for starting an internal combustion engine. An exemplary embodiment of the electrical system includes: an energy storage device comprising a carbon electrode, an aerogel, a first terminal, and a second terminal; a boost converter for charging the energy storage device to a voltage level that remains essentially uniform despite shifts in voltage of a battery that feeds the boost converter and that comprises a positive terminal and a negative terminal; and a circuit. In an exemplary embodiment, the circuit includes: a starter relay; and a conductive path that extends, when the relay is closed, between: the first terminal and a winding of a starter motor; the second terminal and the positive terminal; and the negative terminal and the winding of the starter motor. In an exemplary embodiment, the starter relay is operative to close based on an input from a user, and the starter motor is operative to start the internal combustion engine in response to electricity flowing through the winding.

A system has also been described for applying electricity to a starter motor of a vehicle. In an exemplary embodiment, the system includes: a supercapacitor module for charging a supercapacitor to a first voltage via regulating a transfer of electrical energy from a battery to the supercapacitor based on monitoring the first voltage, wherein the first voltage is in a range of about 3 volts to about 6 volts, and wherein the battery has a second voltage in a range of about 9 volts to about 15 volts; and an electrical circuit that connects the charged supercapacitor and the battery in series with the starter motor.

It is understood that the foregoing description describes examples only and the claims are intended to cover deviations from this disclosure. For example, a wide variety of circuit variations can be implemented to meet assorted performance objectives. Moreover, operational steps of the disclosed methods and elements of the disclosed systems may be omitted or supplemented. In many instances, some features of the present disclosure may be employed without a corresponding use of the other disclosed features. Furthermore, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of boosting an output of a power supply battery in an electrical circuit including a power supply battery operable at a power supply voltage, a supercapacitor, a contactor connected across the supercapacitor, and a switch configured to open and close a current path from the power supply battery and the supercapacitor to an electrical load, wherein the method comprises:
    charging the supercapacitor to a regulated voltage;
    applying, by closing the switch, a series combination of the regulated voltage and the power supply voltage to the electrical load;
    wherein the step of charging the supercapacitor to the regulated voltage comprises charging the supercapacitor to a selected voltage level that is substantially less than the power supply voltage; and
    if the supercapacitor becomes fully discharged, operating the contactor to bypass the supercapacitor and avoid reverse charging of the supercapacitor.

2. The method according to claim 1, wherein the electrical circuit further includes a starter motor for an internal combustion engine, and wherein closing the switch to apply a series combination of the regulated voltage and the power supply voltage to the electrical load comprises closing the switch to connect the series combination of the regulated voltage and the power supply voltage to the starter motor.

3. The method according to claim 1, wherein the electrical circuit further includes a communication device that consumes power intermittently, and wherein closing the switch to apply a series combination of the regulated voltage and the power supply voltage to the electrical load comprises closing the switch to connect the series combination of the regulated voltage and the power supply voltage to the communication device that consumes power intermittently.

4. The method according to claim 1, wherein the electrical circuit further includes a flash lamp, and wherein closing the switch to apply a series combination of the regulated voltage and the power supply voltage to the electrical load comprises closing the switch to connect the series combination of the regulated voltage and the power supply voltage to the flash lamp.

5. The method according to claim 1, wherein the electrical circuit is embodied in a handheld device, and wherein closing the switch to apply a series combination of the regulated voltage and the power supply voltage to the electrical load comprises closing the switch to connect the series combination of the regulated voltage and the power supply voltage to at least one component of the handheld device.

6. The method according to claim 1, wherein the electrical circuit is embodied in a cellular telephone, and closing the switch to apply a series combination of the regulated voltage and the power supply voltage to the electrical load comprises closing the switch to connect the series combination of the regulated voltage and the power supply voltage to at least one component of the cellular telephone.

7. The method according to claim 1, wherein charging the supercapacitor to the regulated voltage comprises maintaining the regulated voltage at a specified level independent of a fluctuation in the power supply voltage.

8. A method of boosting an output of a power supply battery in an electrical circuit including a power supply battery operable at a power supply voltage, a first supercapacitor, a contactor connected across the first supercapacitor, and a switch configured to open and close a current path from the power supply battery and the first supercapacitor to an electrical load, wherein the method comprises:
    maintaining a first voltage on the first supercapacitor via transferring energy from the power supply battery, having a second voltage, to the first supercapacitor, wherein the first voltage is substantially lower than the second voltage; and
    connecting the power supply battery and the first supercapacitor in series with the electrical load, via the switch, while the first voltage is different from the second voltage; and
    when the first capacitor becomes fully discharged, operating the contactor to bypass the supercapacitor and establish a direct connection between the battery and the electrical load.

9. The method according to claim 8, wherein the electrical circuit includes a means for regulating voltage, and the step of maintaining the first voltage on the at first supercapacitor via transferring energy from the battery to the first supercapacitor comprises charging the first supercapacitor with the means for regulating voltage.

10. The method according to claim 8, wherein the electrical circuit includes a boost converter, and the step of transferring energy from the battery to the first supercapacitor comprises feeding electricity to the first supercapacitor from the boost converter.

11. The method according to claim 8, wherein the maintaining step further comprises maintaining the first voltage on the first supercapacitor independent of a fluctuation in the second voltage.

12. The method according to claim 8, wherein the electrical circuit further includes a second capacitor, the method further comprising the step of connecting the second supercapacitor in parallel with the electrical load.

13. The method according to claim 8, wherein the electrical circuit further includes a motor, and wherein connecting the power supply battery and the first supercapacitor in series with the electrical load comprises connecting the power supply battery and the first supercapacitor in series with the motor.

14. The method according to claim 8, wherein
the electrical circuit further includes a communication device that draws electrical power on an intermittent basis, and wherein connecting the power supply battery and the first supercapacitor in series with the electrical load comprises connecting the power supply battery and the first supercapacitor in series with the communication device that draws electrical power on an intermittent basis.

15. An electrical system comprising:
    a supercapacitor;
    a means for charging the supercapacitor to a regulated voltage; and
    a circuit, comprising the supercapacitor and the means for charging the supercapacitor, for applying a series combination of the regulated voltage and a battery voltage to a load in response to a trigger event;
    wherein the electrical system further comprises a second supercapacitor,
    wherein the circuit is operable to connect the second supercapacitor in parallel with the load in response to the trigger event, and
    wherein an occurrence of the trigger event comprises engaging an ignition switch of a vehicle.

16. The electrical system according to claim 15, wherein the load comprises a starter for an internal combustion engine, and wherein the means for charging the supercapacitor to a regulated voltage comprises a boost converter.

17. An apparatus comprising:
    a means for charging a supercapacitor to a first voltage via regulating a transfer of charge from a battery, having a second voltage, to the supercapacitor;
    a means for connecting the charged supercapacitor and the battery in series with a load; and
    a means for bypassing the supercapacitor when fully discharged to prevent reverse charging thereof.

18. The apparatus according to claim 17, wherein the first voltage is substantially lower than the second voltage.

19. The apparatus according to claim 17, wherein regulating the transfer of charge comprises charging the supercapacitor with a DC-to-DC converter that draws power from the battery.

20. The apparatus according to claim 17
    wherein the apparatus is a cell phone, and wherein the load is an element of the cell phone that consumes power intermittently.

21. The apparatus according to claim 17, wherein the apparatus is a digital camera, and wherein the load is a flash lamp.

22. An apparatus comprising:
    a means for charging a supercapacitor to a first voltage via regulating a transfer of charge from a battery, having a second voltage, to the supercapacitor; and
    a means for connecting the charged supercapacitor and the battery in series with a load;
    wherein the first voltage is substantially different than the second voltage; and
    wherein the apparatus is an engine, and the load comprises a motor mechanically coupled to the engine.

* * * * *